(12) United States Patent
Okuno

(10) Patent No.: US 7,869,048 B2
(45) Date of Patent: Jan. 11, 2011

(54) PHOTOELECTONIC SENSOR

(75) Inventor: Motoharu Okuno, Ayabe (JP)

(73) Assignee: Omron Corporation, Kyoto (JP)

( * ) Notice: Subject to any disclaimer, the term of this patent is extended or adjusted under 35 U.S.C. 154(b) by 101 days.

(21) Appl. No.: 12/430,536

(22) Filed: Apr. 27, 2009

(65) Prior Publication Data
US 2009/0268206 A1   Oct. 29, 2009

(30) Foreign Application Priority Data

Apr. 28, 2008  (JP) ............................ P2008-117373
Mar. 17, 2009  (JP) ............................. P2009-64611

(51) Int. Cl.
*G01N 21/55* (2006.01)
(52) U.S. Cl. ...................................... 356/445
(58) Field of Classification Search ................. 356/445; 250/559.11
See application file for complete search history.

(56) References Cited

U.S. PATENT DOCUMENTS 7,561,330 B2 *  7/2009  Goto ........................... 359/459

FOREIGN PATENT DOCUMENTS

| JP | 10-255611 | 9/1998 |
|---|---|---|
| JP | 10-255612 | 9/1998 |

\* cited by examiner

*Primary Examiner*—Roy Punnoose
(74) *Attorney, Agent, or Firm*—Foley & Lardner LLP

(57) ABSTRACT

This invention provides a coaxial regressive reflection type photoelectronic sensor capable of enhancing detection accuracy. A sensor head includes a light emitting diode for emitting a detection light; a lens for converting the detection light to a parallel light and projecting the parallel light to an exterior as an external detection light; a half mirror for separating an optical path of the detection light and an optical path of a return light from the regressive reflection plate; and a photodiode for receiving the return light from the half mirror. The lens includes a convex surface formed to convert a signal light to a parallel light, and a plane tilted from a perpendicular direction with respect to the parallel light or an axis connecting a light emitting diode chip and a center portion of the convex surface. The reflected light of an external signal light at the plane passes a path different from that of the return light so as to be avoided from entering the photodiode chip.

1 Claim, 9 Drawing Sheets

US 7,869,048 B2

PHOTOELECTONIC SENSOR

This application claims priority from Japanese Patent Applications P2008-117373, filed on Apr. 28, 2008 and P2009-64611, filed on Mar. 17, 2009. The entire contents of the aforementioned applications are incorporated herein by reference.

BACKGROUND OF THE INVENTION

1. Technical Field

The present invention relates to photoelectronic sensors and, in particular, to a coaxial regressive reflection type photoelectronic sensor.

2. Related Art

A reflection type photoelectronic sensor that utilizes reflection of light is known as a photoelectronic sensor used to detect the presence of an object. The reflection type photoelectronic sensors include a so-called regressive reflection type photoelectronic sensor.

The regressive reflection type photoelectronic sensor generally includes a light projector/receiver incorporating a light emitting element and a light receiving element. When using such a sensor, a regressive reflection plate for reflecting the light emitted from the light projector/receiver and returning the light to the light projector/receiver is arranged facing the light projector/receiver. If an object does not exist on an optical path of the light emitted from the light emitting element, the light is reflected by the regressive reflection plate and entered to the light receiving element. If an object exists on the optical path, on the other hand, the light emitted from the light emitting element does not enter the light receiving element as the light is shielded by the object. In other words, an amount of received light at the light receiving element differs depending on whether or not the object exists on the optical path, and thus the regressive reflection type sensor detects the presence of the object based on the difference in the amount of received light.

The regressive reflection type photoelectronic sensor includes a twin-lens type and a coaxial type. In the case of the twin-lens type, the light projecting path and a light receiving path are physically separated. In the case of the coaxial type, the light projecting path and the light receiving path are almost coincided, and such optical paths are separated by an optical element (polarizing beam splitter, half mirror, etc.).

The twin-lens regressive reflection type photoelectronic sensor is disclosed, for example, in Japanese Unexamined Patent Publication No. 10-255611 (Patent Document 1). According to this document, the photoelectronic sensor includes a light projecting lens and a light receiving lens. The light projecting lens is arranged only in a region having a possibility the light ray transmitted through the light projecting lens enters the light receiving lens after being reflected by a reflector. The light receiving lens is arranged only in a region having a possibility the light ray exit from a light projecting portion enters the light receiving lens after being reflected by the reflector.

The coaxial regressive reflection type photoelectronic sensor is disclosed, for example, in Japanese Unexamined Patent Publication No. 10-255612 (Patent Document 2). According to Japanese Unexamined Patent Publication No. 10-255612, a slit for limiting the light projecting range is provided in a light projecting element to enhance the utilization efficiency of the light reflected from the regressive reflection plate and to prevent malfunction by refraction of a transparent object. The light projection beam is projected on the regressive reflection plate by a center portion of the lens. The proportion the light is not received at the light receiving element of the lights reflected by the regressive reflection plate is thereby reduced, and thus the utilization efficiency of the light is improved.

SUMMARY

In the case of the coaxial regressive reflection type photoelectronic sensor, the light projecting path and the light receiving path are not physically separated. Thus, part of the light emitted from the light projecting element may enter the light receiving element as stray light. The stray light needs to be prevented as the stray light influences the performance of the sensor. However, the problem of stray light is not specifically described in Japanese Unexamined Patent Publication Nos. 10-255611 and 10-255612.

The present invention has been devised to solve the problems described above, and aims to provide a coaxial regressive reflection type photoelectronic sensor capable of enhancing the detection performance.

In short, In accordance with an aspect of the present invention, there is provided a photoelectronic sensor including: a light projecting portion for emitting a detection light; a lens for converting the detection light from the light projecting portion to a parallel light, and exiting the parallel light to an exterior as an external detection light; an optical path separating portion, arranged on an optical path of the detection light between the light projecting portion and the lens, for separating an optical path of the detection light and an optical path of a return light being light returned when the external detection light is reflected at the exterior; and a light receiving portion for receiving the return light from the optical path separating portion. The lens includes a curved surface, which is an incident surface of the detection light and an exit surface of the return light, formed to convert the detection light to the parallel light, and a plane being formed on an opposite side of the curved surface as an exit surface of the detection light and an incident surface of the return light, and having a normal direction of a plane forming a specific angle with respect to an optical axis direction of the parallel light. The specific angle is selected to an angle the detection light reflected by the plane reaches a position not received by the light receiving portion. The photoelectronic sensor further includes a housing for storing the light projecting portion, the optical path separating portion, and the light receiving portion, and including a planar outer surface at least on one surface. The outer surface has an opening to which the lens is attached. The light projecting portion and the lens are arranged so that an optical axis direction of the external detection light when exit from the lens is perpendicular to the outer surface.

According to the present invention, the detection performance of the photoelectronic sensor can be enhanced in the coaxial regressive reflection type photoelectronic sensor since the entering of stray light at the interior of the housing, which stores the light projecting element and the light receiving element, to the light receiving element can be reduced.

DETAILED DESCRIPTION

Figure 1:
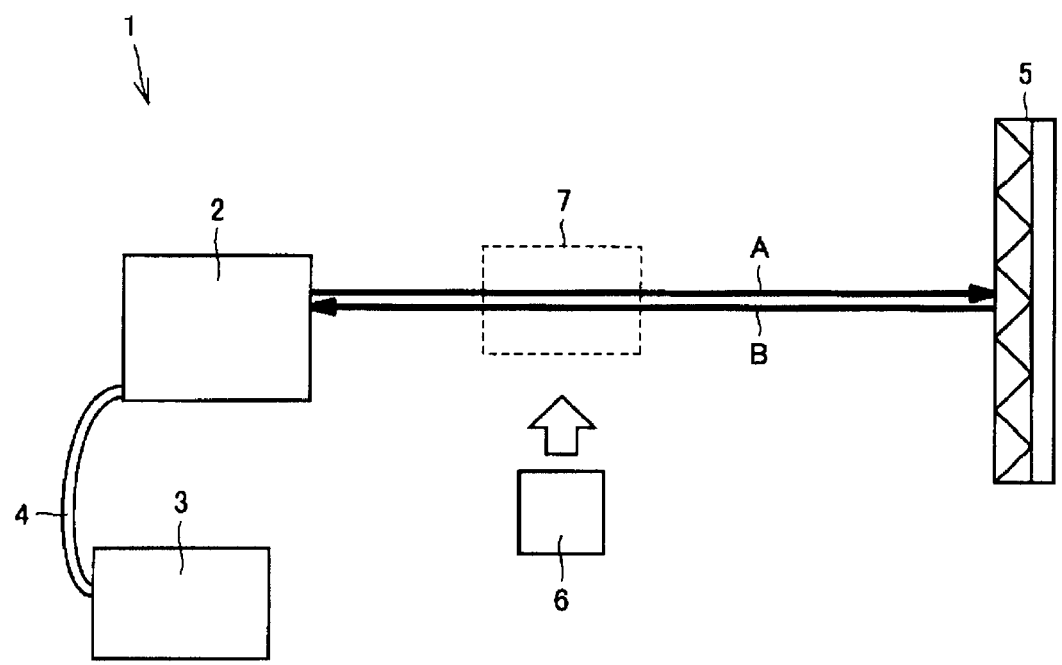
FIG. 1 is an overall configuration view of a photoelectronic sensor according to an embodiment of the present invention.

Hereinafter, preferred embodiments of the present invention will be described in detail with reference to the drawings. Same reference numerals are denoted for the same or corresponding portions throughout the drawings, and the description thereof will not be repeated.

FIG. 1 is an overall configuration view of a photoelectronic sensor according to an embodiment of the present invention. With reference to FIG. 1, a photoelectronic sensor 1 includes a sensor head 2, an amplifier unit 3, a cable 4, and a regressive reflection plate 5.

The sensor head 2 emits a detection light A, which is a parallel light. The regressive reflection plate 5 is arranged facing the sensor head 2, so that the detection light A exit from the sensor head 2 is reflected by the regressive reflection plate 5, and becomes a return light B. The detection light A is a visible light, for example, but merely needs to be light regression reflected by the regressive reflection plate 5, and the wavelength region thereof is not particularly limited.

Figure 2:
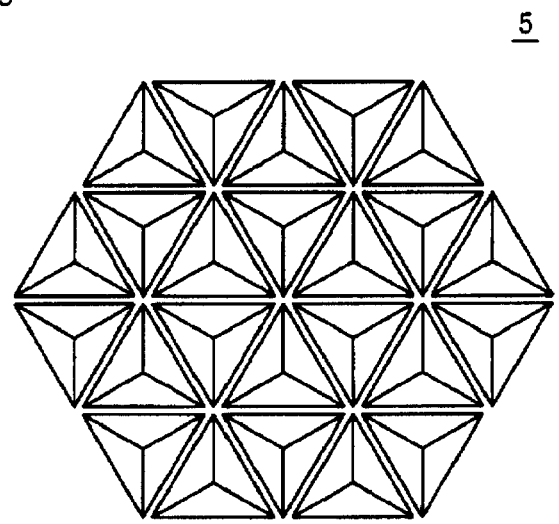
FIG. 2 is an elevation view of a regressive reflection plate 5.

FIG. 2 is an elevation view of the regressive reflection plate 5. With reference to FIG. 2, numerous corner cubes are arranged in the regressive reflection plate 5.

Returning to FIG. 1, the detection light A is reflected at three surfaces of the regressive reflection plate 5, and ultimately becomes the return light B. The return light B is the light of the same axial direction as the detection light A, and advances in a direction opposite to the advancing direction of the detection light A on a path parallel to a path of the detection light A.

The sensor head 2 receives the return light B, and generates an electric signal having an intensity corresponding to an amount of received return light B. The sensor head 2 is connected to the amplifier unit 3 by way of the cable 4 integrated with power supply line, signal line, and the like, and outputs the generated electric signal to the amplifier unit 3 via the cable 4.

The amplifier unit 3 supplies drive voltage to the sensor head 2 via the cable 4. The sensor head 2 receives the drive voltage and emits the detection light A, and also generates an electric signal indicating the amount of received return light B. The amplifier unit 3 also receives a signal from the sensor head 2 via the cable 4. The amplifier unit 3 detects the presence of object based on such a signal, or outputs a signal indicating the amount of received light at the sensor head 2. The sensor head 2 and the amplifier unit 3 are separated from each other according to the configuration shown in FIG. 1, but may be integrated.

The photoelectronic sensor 1 detects the presence of object based on the amount of received light at the sensor head 2. If a measuring target object 6 is not positioned in a region 7 on the optical path of the detection light A, the detection light A exit from the sensor unit 2 is reflected by the regressive reflection plate 5, and becomes the return light B and enters the sensor head 2. If the measuring target object 6 is positioned in the region 7, the detection light A from the sensor head 2 is shielded by the measuring target object 6, and thus the amount of the return light B received by the sensor head 2 decreases. As the amount of received light at the sensor head 2 differs depending on whether or not the measuring target object 6 is positioned in the region 7, the presence of object can be detected from the amount of received light. The amplifier unit 3 receives the electric signal indicating the amount of received light from the sensor unit 2, and for example, detects the presence of the measuring target object 6 in the region 7 by comparing the amount of received light with a predetermined threshold value.

The photoelectronic sensor 1 is a coaxial regressive reflection type photoelectronic sensor in which the light projecting path and the light receiving path are separated by an optical element at the interior of the sensor head 2. The regressive reflection type photoelectronic sensor includes a twin-lens type in which the light projecting path and the light receiving path are physically separated. In the case of the regressive reflection type photoelectronic sensor of twin-lens type, only some of the light reflected by the regressive reflection plate may enter the light receiving element if the interval between the sensor head and the regressive reflection plate becomes short. The coaxial regressive reflection type photoelectronic sensor can avoid such a problem, and thus can avoid lowering of the amount of received light. Therefore, the coaxial regressive reflection type photoelectronic sensor can enhance the detection performance than the twin-lens regressive reflection type photoelectronic sensor.

Figure 3:
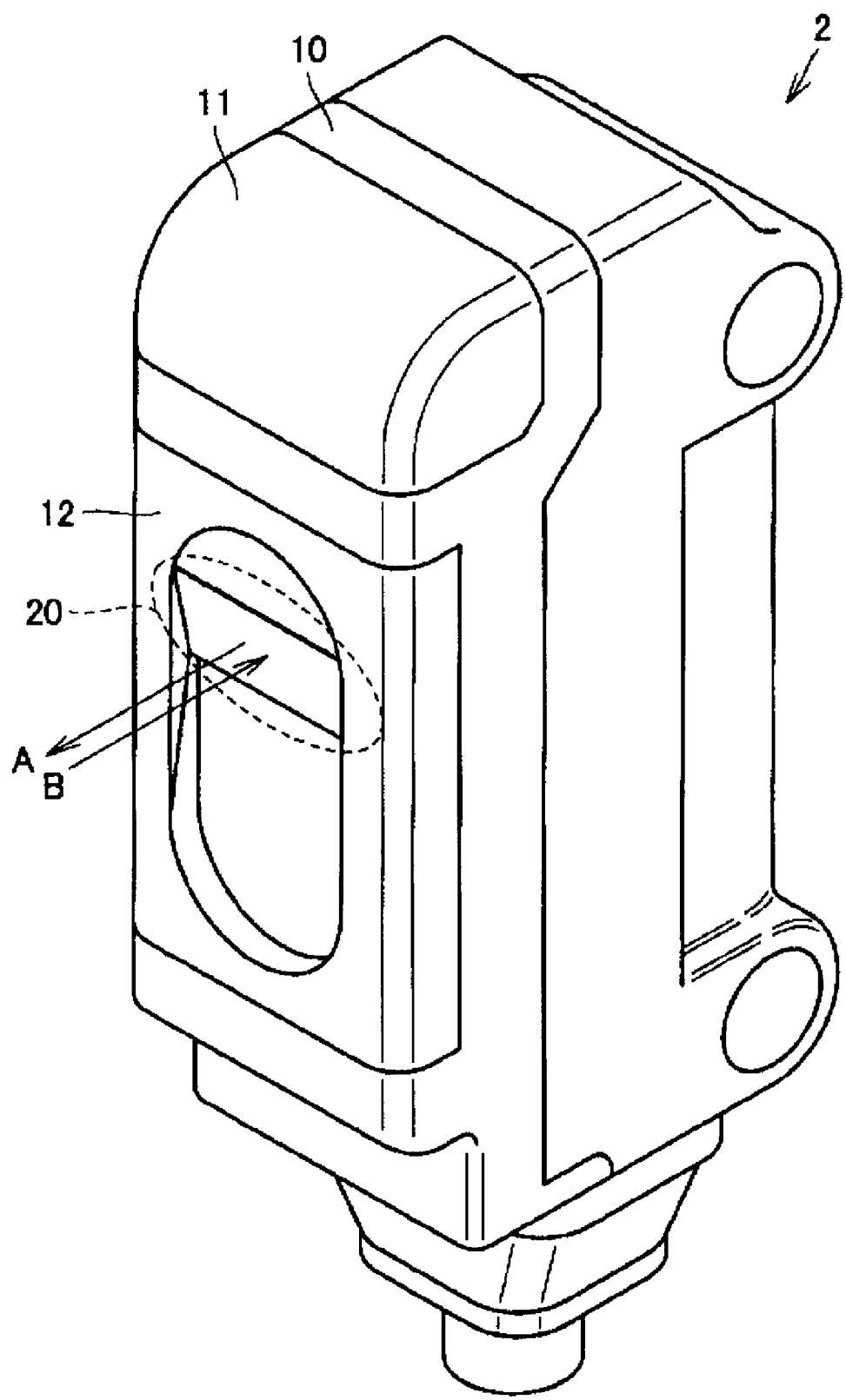
FIG. 3 is an outer appearance perspective view of a sensor head 2 shown in FIG. 1 seen from a light projecting/receiving portion side.

FIG. 3 is an outer appearance perspective view of the sensor head 2 shown in FIG. 1 seen from a light projecting/receiving portion side. With reference to FIG. 3, the sensor head 2 includes a case 10, a window 11, and a protective cover 12. The case 10 stores the light projecting portion, the light receiving portion and the like, and also includes an opening for passing the detection light A emitted from the light projecting portion and the return light B to be received by the light receiving portion.

The window 11 is formed by a translucent member (e.g., transparent resin). Although not shown, an indicator light representing the presence of power supply and/or presence of measuring target object in a lighted state and a non-lighted state is provided inside the case 10. The window 11 is provided to enable the user to grasp the lighted state and the non-lighted state of the indicator light.

The protective case 12 is attached to the case 10 to cover the opening of the case 10. The protective case 12 includes a lens 20 arranged at a location corresponding to the opening of the case 10. The lens 20 has a convex surface on the interior side of the sensor head 2. The lens 20 also has a plane on the exterior side of the sensor head 2. The detection light A is exit from the plane and the return light B enters the plane.

Figure 4:
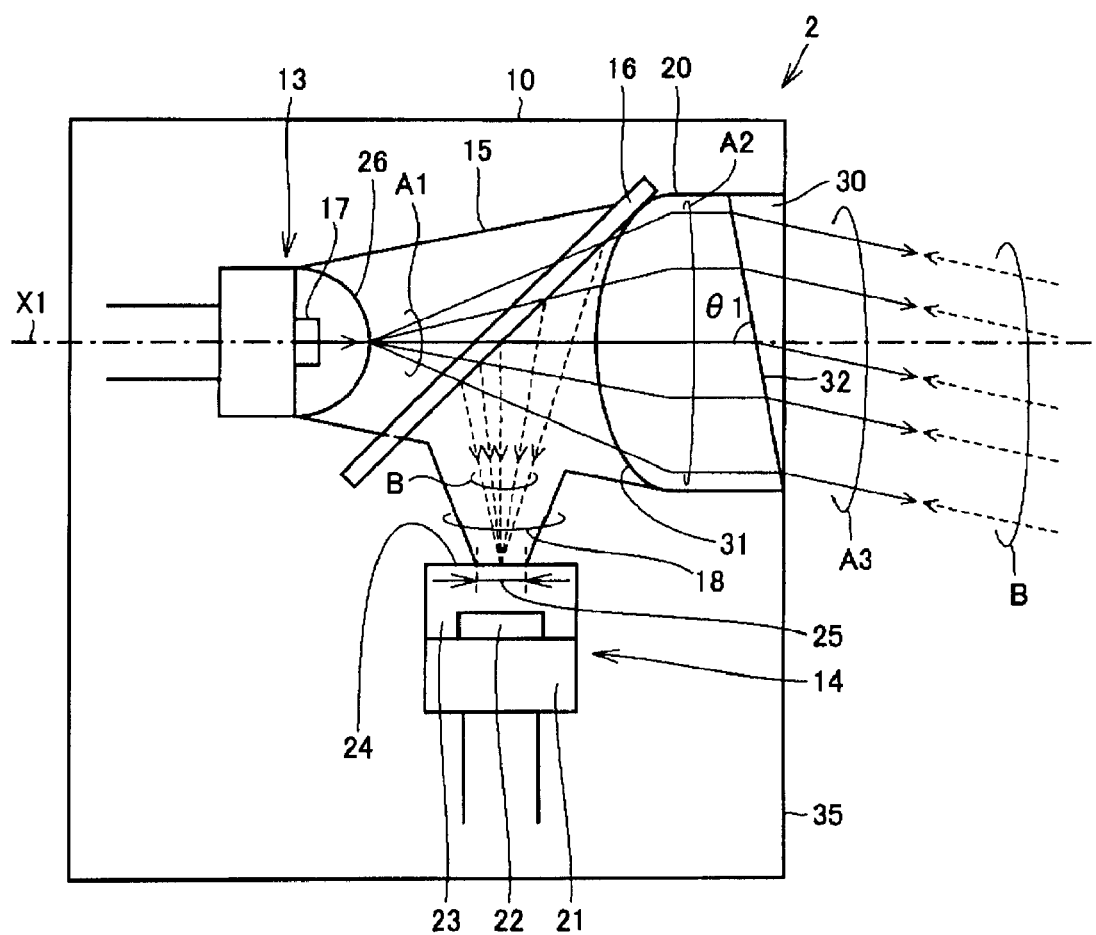
FIG. 4 is a block diagram of the sensor head 2 shown in FIG. 3.

FIG. 4 is a block diagram of the sensor head 2 shown in FIG. 3. With reference to FIG. 4, the sensor head 2 includes the case 10, a light emitting diode 13, a photodiode 14, a holder 15, a half mirror 16, and the lens 20.

The light emitting diode 13 is a light projecting portion including a light emitting diode chip 17 that emits a detection light A1. The detection light A1 from the light emitting diode 13 advance through the interior of the holder 15 while spreading, transmits through the half mirror 16, and enters the lens 20. The detection light A1 is illustrated to spread from the surface of a translucent resin layer 26 in FIG. 4 for the sake of convenience of the explanation, but the spreading of the detection light A1 shown in FIG. 4 also includes a case where the detection light A1 advances while spreading from the light emitting surface of the light emitting diode chip 17. This is the same in the figures described below.

The holder 15 passes the detection light A1 and the return light B. The holder 15 is formed with a hole in a direction from the light emitting diode 13 to the lens 20 as an interior optical path through which the detection light A1 and the return light B pass. The holder 15 also includes an interior optical path 18 connecting to the hole and having a hole through which the return light B passes formed on the interior.

The lens 20 is attached to an opening 30 formed in the case 10. The lens 20 includes a convex surface 31 faced towards the half mirror 16, and a plane 32 formed on the opposite side of the convex surface 31. The detection light A1 passes through the convex surface 31, which is an interface between air and the lens 20, and is converted to a parallel light A2. The parallel light A2 advances through the interior of the lens 20, and is exit from the plane 32 to the exterior of the case 10 as an external detection light A3. The external detection light A3 exit from the lens 20 is reflected by the regressive reflection plate 5 (see FIG. 1) and becomes the return light B.

The return light B advances the path of the external detection light A3 in a direction opposite to the advancing direction of the external detection light A3, and enters the lens 20 from the plane 32. The return light B that transmitted the lens 20 is exit from the convex surface 31. The return light B exit from the convex surface 31 is reflected by the half mirror 16, and passes through the interior optical path 18 formed in the holder 15, as shown with a broken line in the figure, and enters the photodiode 14.

The half mirror 16 is arranged on the optical path of the detection light A1 between the light emitting diode 13 and the lens 20. The half mirror 16 is an optical path separating portion that separates the optical path (light projecting path) of the detection light A1, the parallel light A2, and the external detection light A3, and the optical path (light receiving path) of the return light B.

The photodiode 14 receives the return light B collected by the lens 20. The photodiode 14 includes a base material 21, a photodiode chip 22 mounted on a main surface of the base material 21, and a translucent resin layer 23 that seals the main surface of the base material 21 and the photodiode chip 22 and that has a light receiving surface 24 faced towards the half mirror 16.

The return light B exit from the lens 20 and reflected by the half mirror 16 is collected at the light receiving surface 24 of the translucent resin layer 23. The light from an exit end of the internal optical path 18 enters a light receiving region of the photodiode chip 22. A light receiving range 25 is a range of smaller than or equal to a diameter of the exit end of the internal optical path 18 at the light receiving surface 24.

The case 10 corresponds to an outer contour of the sensor head 2. The case 10 stores the light emitting diode 13, the photodiode 14, and the half mirror 16, and includes an outer surface 35 formed with the opening 30.

An axis X1 indicates the optical axis of the parallel light A2 set as a parallel light by the light emitting diode 13 and a center portion of the convex surface 31 of the lens 20.

In the present embodiment, the plane 32 of the lens 20 is tilted from a perpendicular direction with respect to the axis X1. As shown in FIG. 4, assuming an angle formed by an extended line of the axis X1 and the plane 32 as θ1, the angle θ1 is an angle different from 90°.

The direction perpendicular to the outer surface 35 is called "machine axial direction of the sensor". In the present embodiment, the axis X1 coincides with the axis in the machine axial direction of the sensor.

The amount of stray light received by the photodiode 14 increases if the plane 32 is orthogonal to the axis X1. In the present embodiment, the plane 32 is tilted with respect to the axis X1. The entering of the stray light to the photodiode 14 is thereby prevented. Since the parallel light A2 is parallel to the axis X1, tilting the plane 32 with respect to the axis X1 is the same as tilting the plane 32 with respect to the parallel light A2.

Figure 5:
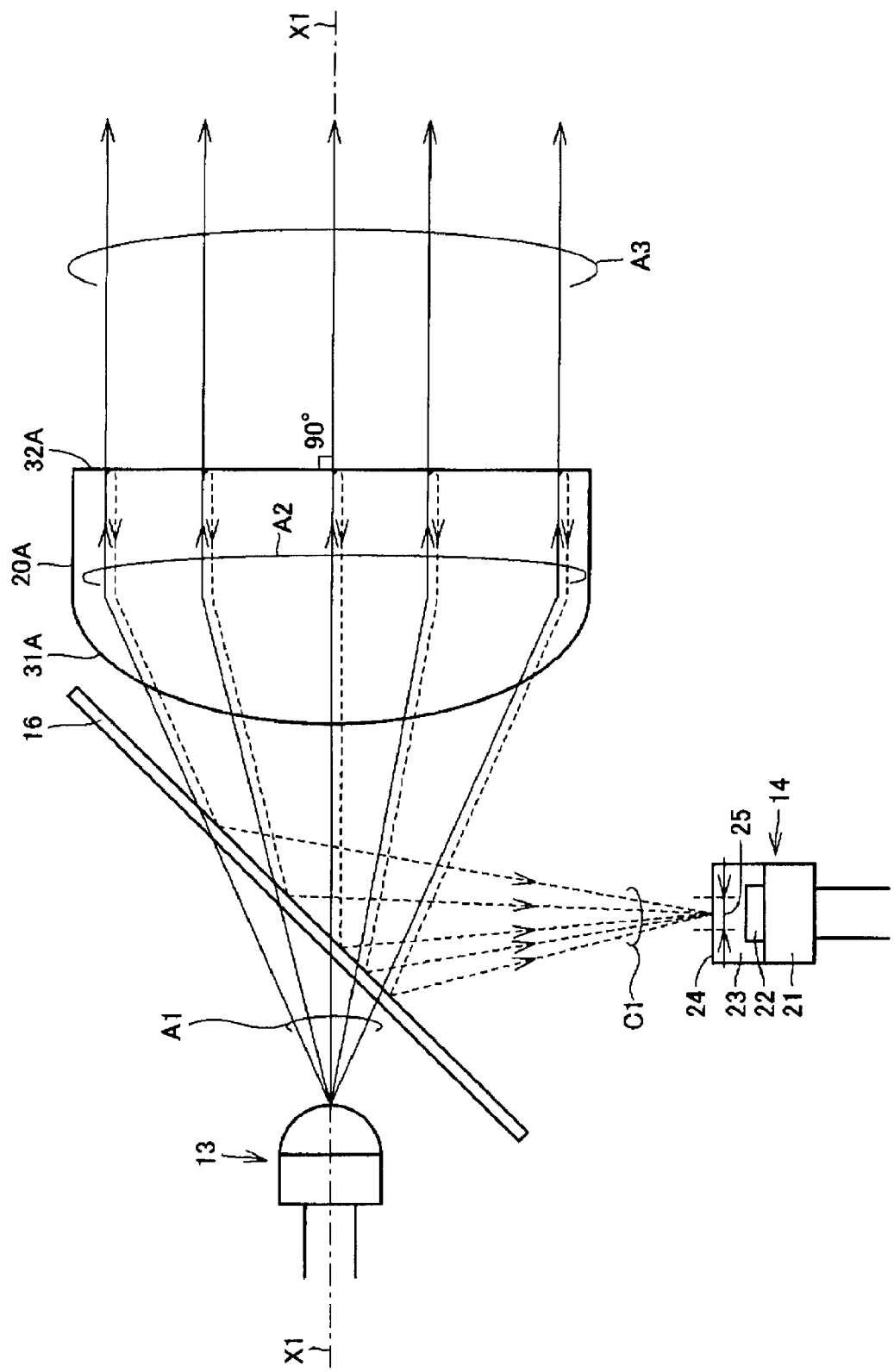
FIG. 5 is a view describing the problem that arises when the plane of the lens is perpendicular to the axis X1.

FIG. 5 is a view describing the problem that arises when the plane of the lens is perpendicular to the axis X1. With reference to FIG. 5, a lens 20A includes a convex surface 31A faced towards the half mirror 16, and a plane 32A formed on the opposite side of the convex surface 31A. The configuration of other portions shown in FIG. 5 is similar to the configuration of the corresponding portions of FIG. 4. The detection light A1 from the light emitting diode 13 is converted to the parallel light A2 by the convex surface 31A of the lens 20A. The optical axis of the parallel light A2 and the axis X1 overlap each other.

The detection light A1 from the light emitting diode 13 is transmitted through the half mirror, and converted to the parallel light A2 by being refracted when passing through the convex surface 31A, which is the interface of the air and the lens 20A. The parallel light A2 advances through the interior of the lens 20A and reaches the plane 32A. When the parallel light A2 reaches the plane 32A, part of the parallel light A2 is reflected by the plane 32A and becomes a reflected light C1.

At the interior of the lens 20A, the parallel light A2 advances in the perpendicular direction with respect to the plane 32A, and is reflected in a direction opposite to the incident direction by the plane 32A. The reflected light C1 generated by such reflection advances the optical path of the parallel light A2 in the direction opposite to the advancing direction of the parallel light A2. In other words, the reflected light C1 is the light of the same axial direction as the external detection light A3. Therefore, the reflected light C1 follows the optical path same as the return light B. The reflected light C1 exit from the lens 20A is reflected by the half mirror 16 and collected within the light receiving range 25 of the light receiving surface 24, and then enters the photodiode chip 22. In other words, the reflected light C1 becomes the stray light that enters the photodiode chip 22.

In the configuration shown in FIG. 5, assumption is made that almost all the reflected component (reflected light C1) of the parallel light A2 generated at the plane 32 of the lens 20A enters the photodiode 14, and thus the amount of stray light received by the photodiode chip 22 becomes large. In order to solve such a problem, the optical path of the reflected light needs to be taken into consideration such that the reflected light generated by the reflection of the parallel light at the plane of the lens does not enter the photodiode. The reviewed example of the present embodiment for solving the above problem will be described below.

Figure 6:
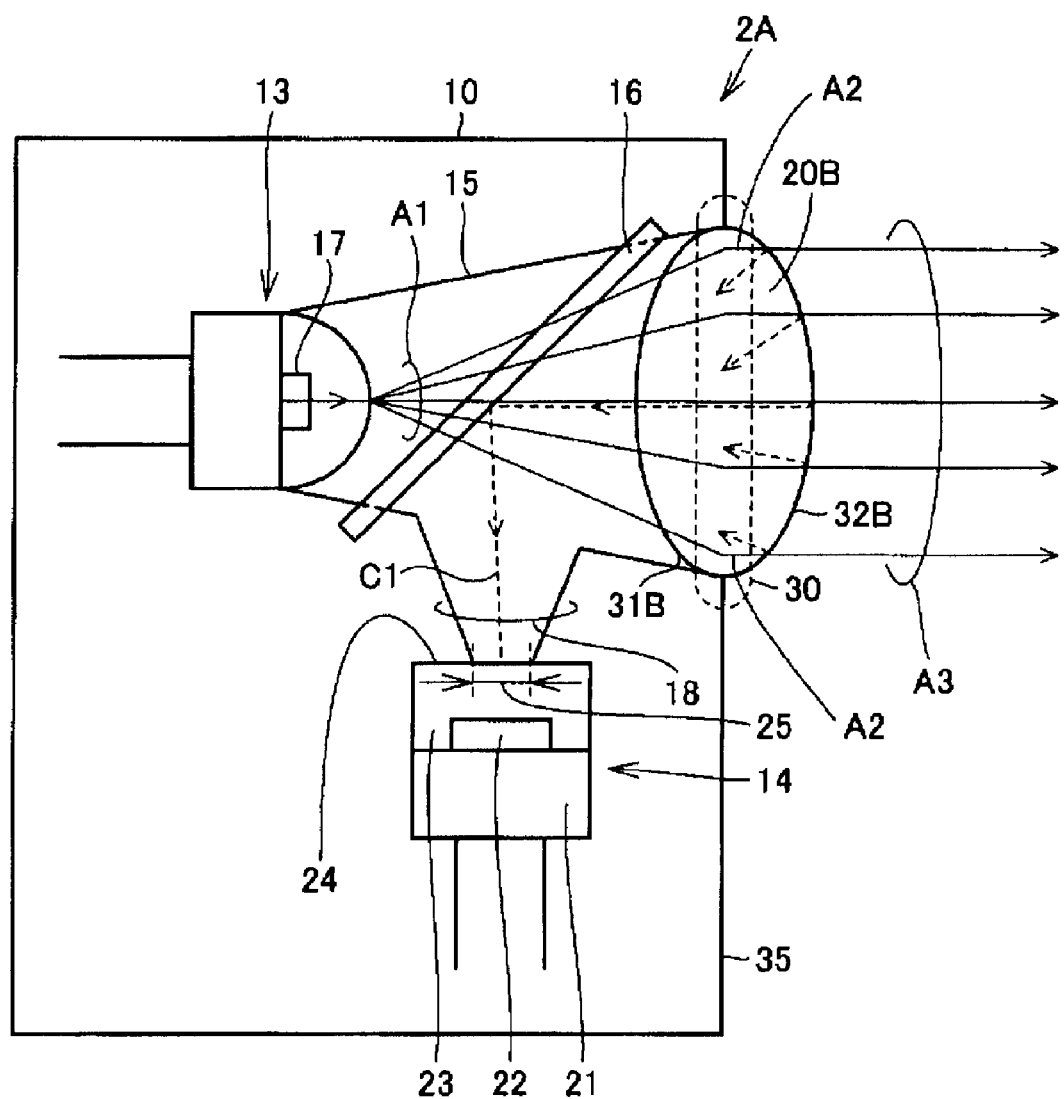
FIG. 6 is a view showing a first reviewed example for preventing the stray light in the sensor head.

FIG. 6 is a view showing a first reviewed example for preventing the stray light in the sensor head. With reference to FIGS. 6 and 4, a sensor head 2A differs from the sensor head 2 in including a lens 20B in place of the lens 20. The configuration of other portions of the sensor head 2A is similar to the sensor head 2.

The lens 20B is a biconvex lens having a convex surface 31B faced towards the half mirror 16 and a convex surface 32B formed on the opposite side. The convex surface 32B projects out to the outer side of the case 10 from the case 10 (outer surface 35).

According to the configuration shown in FIG. 6, a curved surface is formed on the opposite side of the convex surface 31B faced towards the half mirror 16. When the curved surface (convex surface 32B) reflects the parallel light A2, the possibility the parallel light A2 is reflected in the direction same as the incident direction of the parallel light A2 becomes small, and thus the possibility the reflected light C1 enters the photodiode 14 following the optical path of the parallel light A2 becomes small. Thus, it is assumed that the stray light entering the photodiode 14 can be reduced.

However, since the convex surface 32B projects out from the case 10 (outer surface 35), the convex surface 32B has a possibility of being scratched when using the sensor head 2A. The scratch of the convex surface 32B is assumed to cause, for example, the external detection light A3 exit from the lens 20B to scatter or attenuate. In this case, the detection performance of the sensor may lower as the amount of return light reduces. Therefore, consideration is made in changing the configuration shown in FIG. 6 so that the convex surface 32B is not scratched.

Figure 7:
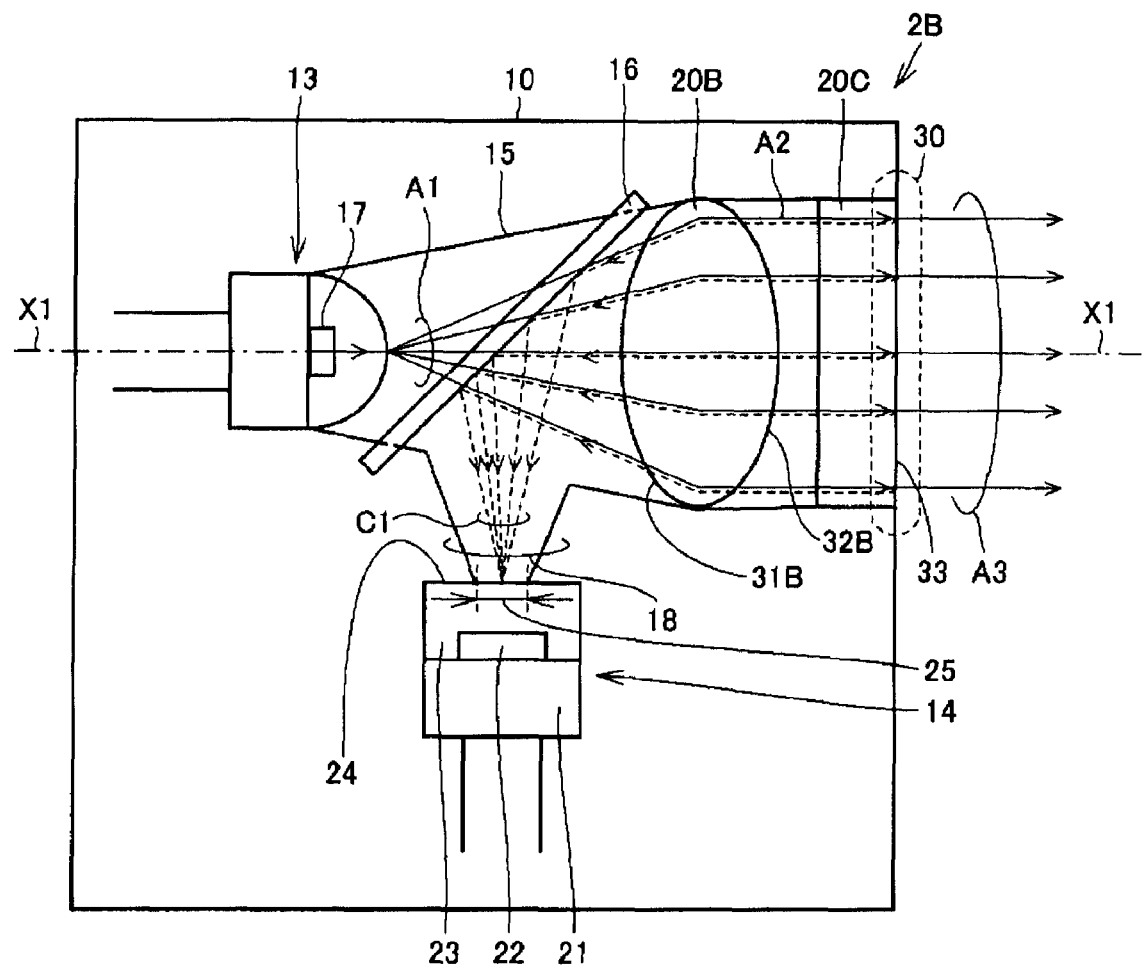
FIG. 7 is a view showing a second reviewed example for suppressing the stray light of the sensor head.

FIG. 7 is a view showing a second reviewed example for suppressing the stray light of the sensor head. With reference to FIGS. 7 and 6, a sensor head 2B differs from the sensor head 2A in further including a lens protective cover 20C provided at the opening 30. Other portions of the sensor head 2B are similar to the configuration of the corresponding portions of the sensor head 2A.

The lens protective cover 20C has a plane 33 perpendicular to the axis X1 (axis connecting a point in a light emitting surface of the light emitting diode chip 17 and a point in a center portion of the convex surface 31B) defined by the light emitting diode 13 and the center portion of the convex surface 31B. The convex surface 32B of the lens 20B is avoided from being exposed to the exterior of the case 10 by providing the lens protective cover 20. However, the detection light A1 transmits through the lens 20B and becomes the parallel light A2, and some of the parallel light A2 is reflected by the plane 33 and becomes the reflected light C1. The reflected light C1 is collected within the light receiving range 25 of the light receiving surface 24 as the reflected light C1 advances through the optical path of the parallel light A2 in the direction opposite to the advancing direction of the parallel light A2. Therefore, according to the configuration shown in FIG. 7, the problem same as the problem arising from the configuration of FIG. 5, that is, the problem in that the amount of stray light received by the photodiode chip 22 becomes large arises.

Figure 8:
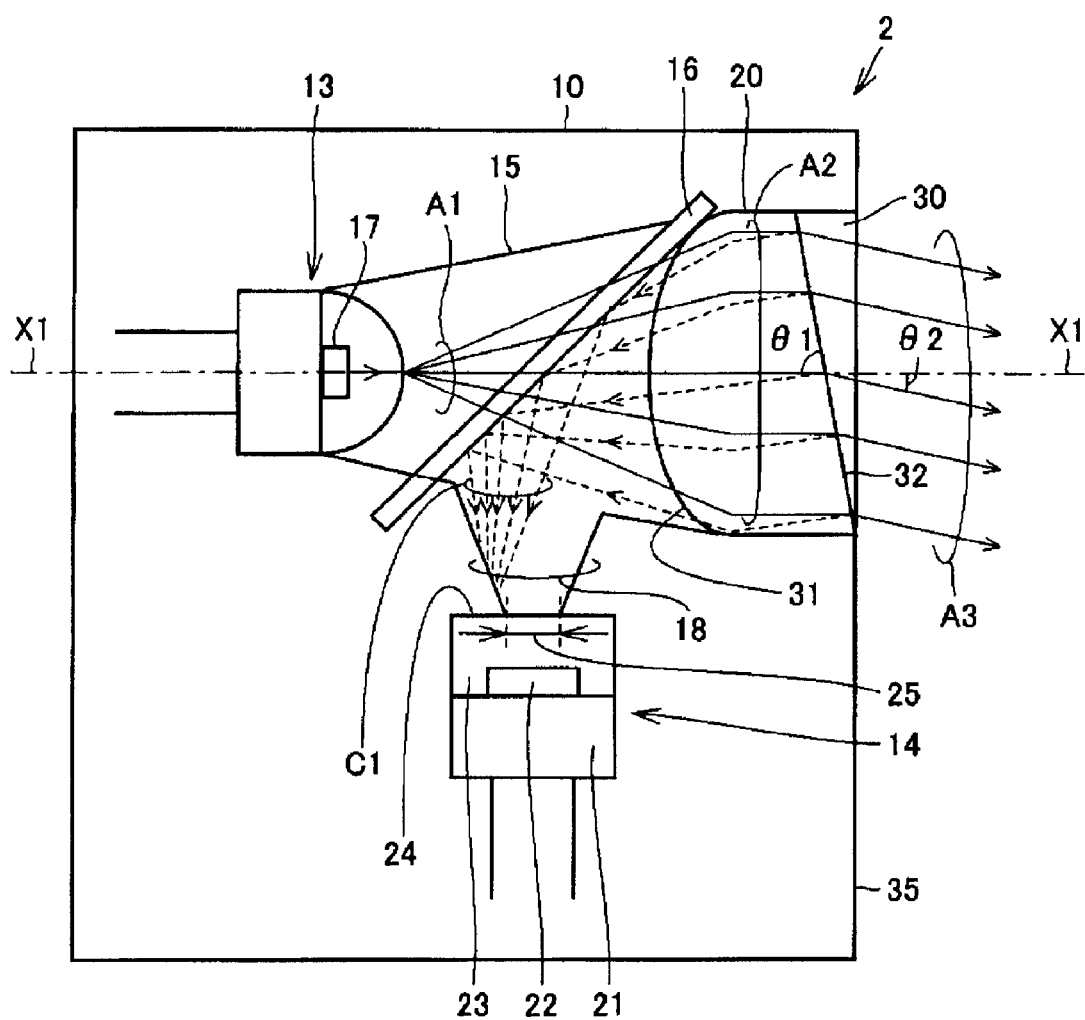
FIG. 8 is a view showing an optical path of the reflected light component of the parallel light A2 generated at the interior of the sensor head 2 according to the present embodiment.

FIG. 8 is a view showing an optical path of the reflected light component of the parallel light A2 generated at the interior of the sensor head 2 according to the present embodiment. With reference to FIG. 8, the detection light A1 entered to the lens 20 is converted to the parallel light A2 by the convex surface 31, and reaches the plane 32. Some of the parallel light A2 reaching the plane 32 is reflected and becomes the reflected light C1. The plane 32 is tilted with respect to the axis X1, but since the parallel light A2 is parallel to the axis X1, the plane 32 is tilted with respect to the parallel light A2. Therefore, the reflected light C1 advances in a direction different from the direction opposite to the advancing direction of the parallel light A2, and is reflected by the half mirror 16, and reaches the inner wall of the interior optical path 18. In other words, the reflected light C1 does not reach the light receiving range 25.

The parallel light A2 is refracted at the plane 32, which is the interface of the lens 20 and the air, and exit from the lens 20, and becomes the external detection light A3 advancing in a direction of a predetermined angle $\theta 2$ with respect to the axis X1. As shown in FIG. 4, the return light B generated when the external detection light A3 is reflected by the regressive reflection plate follows the same optical path as the optical path of the parallel light A2. In other words, the return light B is refracted when reaching the plane 32 of the lens 20, and advances through the interior of the lens 20. The return light B exit from the lens 20 reaches the half mirror 16. The return light B reflected by the half mirror 16 is collected at the light receiving range 25 of the light receiving surface 24 of the photodiode 14.

Thus, the return light B enters the light receiving range 25, whereas the reflected light C1 does not enter the light receiving range 25. Therefore, the entering of stray light to the photodiode 14 can be suppressed according to the configuration of the present embodiment.

The angle $\theta 2$ is not particularly limited, and may be appropriately defined, for example, based on the installation condition, usage condition, or the like of the sensor head 2. A method for setting the angle $\theta 2$ includes a method of adjusting the incident range of the detection light A1 at the convex surface 31 of the lens 20, a method of adjusting the tilt (angle $\theta 1$) of the plane 32 with respect to the axis X1, and the like. Only one of such methods may be used, or a plurality of methods may be used in combination.

The direction of the axis X1 is preferably defined such that the optical axis of the external detection light A3 is perpendicular to the outer surface 35, and more preferably so as to coincide with the axis passing through the center of the opening 30. When manufacturing the sensor head 2, for example, the exit direction of the external detection light A3 can be easily adjusted by defining the direction of the axis X1 in advance.

Figure 9:
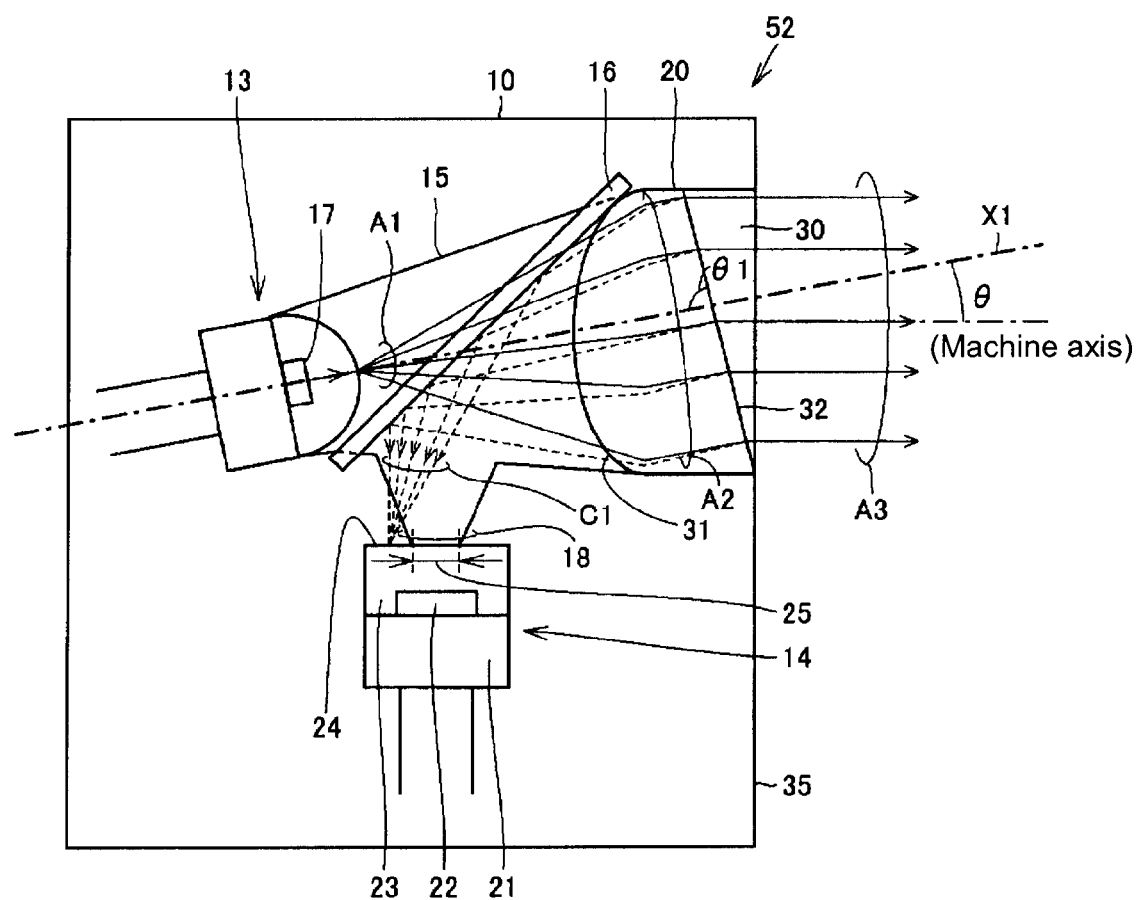
FIG. 9 is a view showing a configuration of a sensor head 52 according to a variant of the present embodiment.

FIG. 9 is a view showing a configuration of a sensor head 52 according to a variant of the present embodiment. With reference to FIG. 9, the axis X1 forms a predetermined angle $\theta$ greater than 0° with respect to the machine axis of the sensor. The optical axis of the external detection light A3 exit from the lens 20 thus coincides with the machine axis of the sensor. According to such a configuration, the stray light is prevented from entering the photodiode, and furthermore, the operability of the user can be enhanced. Similar to the configurations shown in FIGS. 4 and 8, the angle $\theta 1$ formed by the extended line of the axis X1 and the plane 32 is an angle different from 90°.

The operability of the user is, for example, the adjustment of directing the optical axis of the external detection light A3 towards the regressive reflection plate 5. Since the optical axis direction of the external detection light A3 coincides with the machine axial direction of the sensor, the regressive reflection plate 5 can be positioned in the optical axis direction of the external detection light A3 by adjusting the direction of the case 10 such that the regressive reflection plate 5 is positioned in the machine axial direction. The user can easily adjust the direction of the optical axis of the external detection light A3 exit from the sensor head 2, whereby the operability of the user can be enhanced.

Comprehensively describing the sensor head 2 according to the present embodiment while referencing FIGS. 4 and 8, the sensor head 2 includes the light emitting diode 13 for emitting the detection light A1, the lens 20 for converting the detection light A1 to the parallel light A2 and projecting the parallel light A2 to the exterior as the external detection light A3, the half mirror 16 for separating the optical path of the detection light A1 and the optical path of the return light B from the regressive reflection plate 5, and the photodiode 14 for receiving the return light B from the half mirror 16. The lens 20 is the incident surface of the detection light A1 and the exit surface of the return light B, and includes the convex surface 31 formed to convert the detection light A1 to the parallel light A2, and the plane 32 formed on the opposite side of the convex surface 31 as the exit surface of the parallel light A2 and the incident surface of the return light B and tilted from the perpendicular direction with respect to the parallel light A2 or the axis X1 connecting the light emitting diode chip 17 contained in the light emitting diode 13 and the main point of the convex surface 31 (i.e., vertex portion of the curved surface of the lens). According to the present embodiment, the parallel light A2 is parallel to the axis X1, and thus although described as "tilted from the perpendicular direction with respect to the parallel light A2 or the axis X1", "tilted from the perpendicular direction with respect to the parallel light A2" and "tilted from the perpendicular direction with respect to the axis X1" are substantially the same.

The plane 32 is a plane which normal direction forms a specific angle with respect to the optical axis direction of the parallel light A2. The specific angle is chosen to be an angle at which the detection light A1 reflected by the plane 32, that is, the reflected light C1 reaches the position not received by the photodiode 14. The sensor head 2 further includes the case 10 for storing the light emitting diode 13, the half mirror 16, and the photodiode 14, and including a planar outer surface at least on one surface. The outer surface of the case 10 includes the opening 30 to which the lens 20 is attached.

Furthermore, with reference to FIG. 9, according to one embodiment of the present invention, the light emitting diode 13 and the lens 20 are arranged such that the optical axis direction of the external detection light A3 of when exit from the lens 20 becomes perpendicular to the outer surface of the case 10.

The reflected light C1 of the parallel light A2 at the plane 32 is collected on the outer side of the light receiving range 25 of the light receiving surface 24 of the photodiode 14 by passing through the optical path different from that of the return light B, and thus is avoided from entering the photodiode chip 22. The reflected light C1 which is the stray light is thus prevented from entering the photodiode, whereby the detection performance of the photoelectronic sensor can be enhanced.

Figure 10:
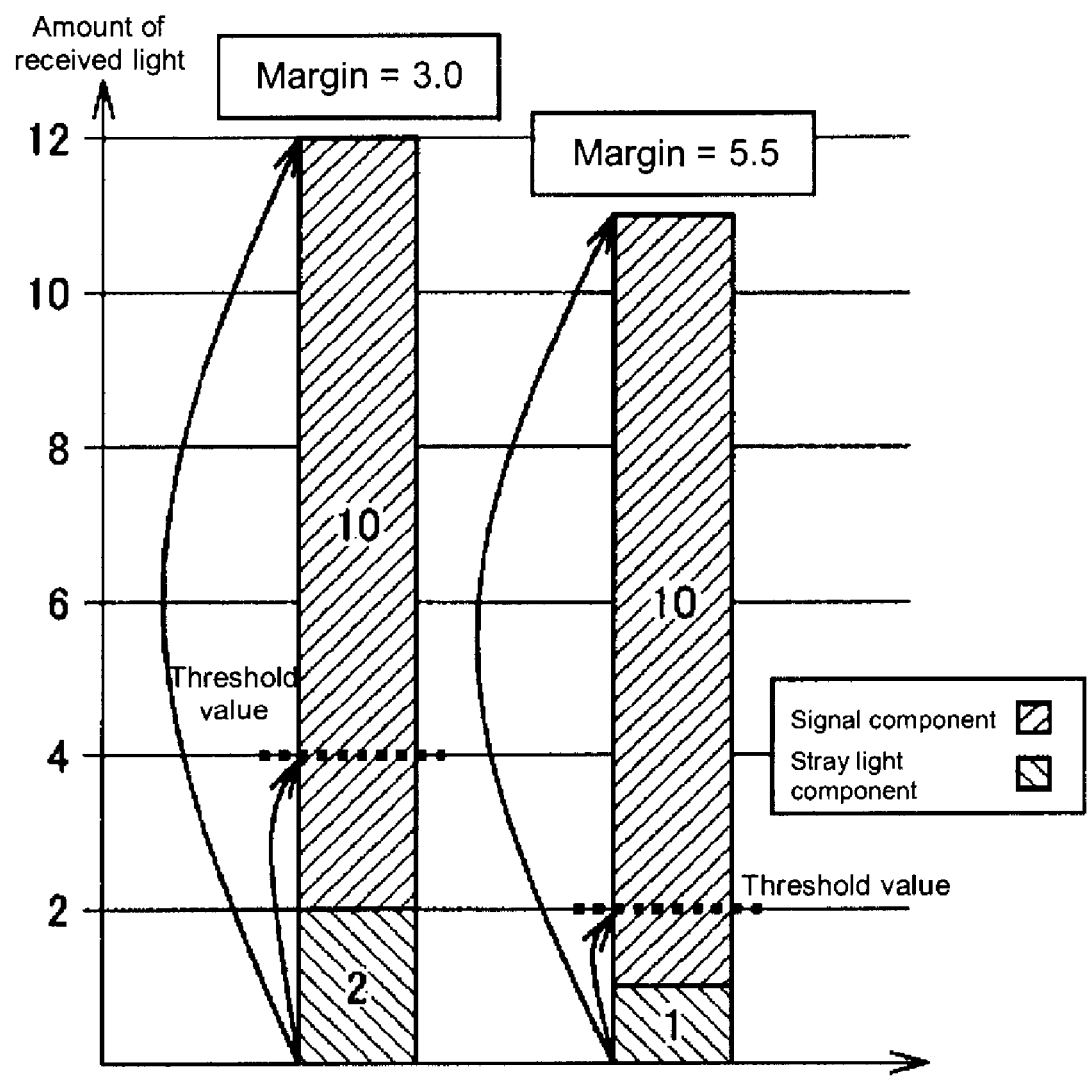
FIG. 10 is a view describing the influence of the stray light on the detection performance of the photoelectronic sensor.

FIG. 10 is a view describing the influence of the stray light on the detection performance of the photoelectronic sensor. With reference to FIG. 10, the photoelectronic sensor 1 according to the present embodiment detects the presence of the measuring target object 6 when the amount of return light received by the photodiode 14 is smaller than a threshold value. The amount of received light of twice the stray light the photodiode 14 receives is assumed as the threshold value for detecting the presence of the measuring target object 6. The threshold value shown in FIG. 10 is merely an example, and is not limited thereto.

The margin of the sensor is the ratio of the threshold value with respect to the total amount of received light of the photodiode (sum of the amount of received return light which is the detection signal component and the amount of received light of stray light component). When referring to the margin being x (x is an arbitrary numerical value), this means that the presence of the object can be detected until the total amount of received light of the photodiode lowers to 1/x.

In regards to the light emitting element such as the light emitting diode, the light emitting amount of the light emitting element reduces as the operation time becomes longer. Due to such reduction in the light emitting amount or environmental change after installation of the sensor such as stains of the lens surface and the lens protective cover, the light amount of the detection signal component (return light) received by the photodiode reduces. In such a case as well, the long-term stability of the detection operation can be ensured if the margin is high. Therefore, lowering of the light emitting amount, and the lowering of the detection performance caused by environmental change after installation of the sensor can be prevented. The detection distance becomes longer the higher the margin. In other words, the detection performance of the sensor is superior the larger the margin.

For example, when the amount of received light of stray light component at the photodiode is 2, the amount of received light indicating the threshold value is 4. When the amount of received light of detection signal component is 10, the margin of the photoelectronic sensor is 3 (=12/4). If the amount of received light of stray light component at the photodiode reduces from 2 to 1, the amount of received light indicating the threshold value becomes 2. If the amount of received light of detection signal component is 10, the margin of the sensor is 5.5 (=11/2). When the stray component reduces, the margin of the sensor can be enhanced even if the magnitude of the signal component is the same. In other words, the detection performance of the sensor can be enhanced.

The embodiment disclosed herein is illustrative in all aspects and should not be construed as being restrictive. The scope of the invention is indicated by the Claims rather than by the above description, and all modifications equivalent in meaning to the Claims and within the scope of the invention are intended to be encompassed.

What is claimed is:

1. A photoelectronic sensor comprising:
a light projecting portion for emitting a detection light;
a lens for converting the detection light from the light projecting portion to a parallel light, and exiting the parallel light to an exterior as an external detection light;
an optical path separating portion, arranged on an optical path of the detection light between the light projecting portion and the lens, for separating an optical path of the detection light and an optical path of a return light being light returned when the external detection light is reflected at the exterior; and
a light receiving portion for receiving the return light from the optical path separating portion; wherein
the lens includes,
a curved surface, which is an incident surface of the detection light and an exit surface of the return light, formed to convert the detection light to the parallel light, and
a plane being formed on an opposite side of the curved surface as an exit surface of the detection light and an incident surface of the return light, and having a normal direction of a plane forming a specific angle with respect to an optical axis direction of the parallel light;
the specific angle is selected to an angle the detection light reflected by the plane reaches a position not received by the light receiving portion; and
wherein the photoelectronic sensor further comprises a housing for storing the light projecting portion, the optical path separating portion, and the light receiving portion, and including a planar outer surface;
the outer surface has an opening to which the lens is attached; and
the light projecting portion and the lens are arranged so that an optical axis direction of the external detection light when exit from the lens is perpendicular to the outer surface.

* * * * *

UNITED STATES PATENT AND TRADEMARK OFFICE
CERTIFICATE OF CORRECTION

| | | |
|---|---|---|
| PATENT NO. | : 7,869,048 B2 | |
| APPLICATION NO. | : 12/430536 | |
| DATED | : January 11, 2011 | |
| INVENTOR(S) | : Motoharu Okuno | |

It is certified that error appears in the above-identified patent and that said Letters Patent is hereby corrected as shown below:

On the title page, item (54) and col. 1, line 1,

The title of the invention has a typographical error. The correct title is:

PHOTOELECTRONIC SENSOR

Signed and Sealed this
Twenty-ninth Day of March, 2011

David J. Kappos
*Director of the United States Patent and Trademark Office*